United States Patent
Sleight et al.

(10) Patent No.: US 10,993,156 B2
(45) Date of Patent: Apr. 27, 2021

(54) VARIABLE SIZE LINEAR VIDEO CONTENT BUFFERS FOR UNINTERRUPTED HANDOVER IN A MULTI-BEAM SATELLITE SYSTEM

(71) Applicant: ViaSat, Inc., Carlsbad, CA (US)

(72) Inventors: Brian T. Sleight, Carlsbad, CA (US); Nirmalkumar Velayudhan, San Marcos, CA (US); Joshua G. Slater, Rancho Mission Viejo, CA (US)

(73) Assignee: VIASAT, INC., Carlsbad, CA (US)

( * ) Notice: Subject to any disclaimer, the term of this patent is extended or adjusted under 35 U.S.C. 154(b) by 42 days.

(21) Appl. No.: 16/839,912

(22) Filed: Apr. 3, 2020

(65) Prior Publication Data

US 2020/0236599 A1    Jul. 23, 2020

Related U.S. Application Data

(63) Continuation of application No. 16/579,423, filed on Sep. 23, 2019, now Pat. No. 10,652,791, which is a continuation of application No. 15/258,846, filed on Sep. 7, 2016, now Pat. No. 10,470,091.

(51) Int. Cl.

| | |
|---|---|
| *H04W 36/02* | (2009.01) |
| *H04L 29/08* | (2006.01) |
| *H04L 29/06* | (2006.01) |
| *H04W 36/32* | (2009.01) |
| *H04W 28/14* | (2009.01) |
| *H04L 12/825* | (2013.01) |

(Continued)

(52) U.S. Cl.
CPC ....... *H04W 36/023* (2013.01); *H04L 65/1083* (2013.01); *H04L 65/4084* (2013.01); *H04L 67/2857* (2013.01); *B64D 11/0015* (2013.01);
*H04L 47/263* (2013.01); *H04L 47/30* (2013.01); *H04W 28/14* (2013.01); *H04W 36/32* (2013.01)

(58) Field of Classification Search
CPC ....... H04L 47/30; H04L 47/263; H04L 47/25; H04L 67/2842; H04L 67/2847; H04L 65/4069; H04L 67/2852; H04L 67/2857; H04W 28/14; H04W 36/02; H04W 36/023; H04W 36/32
See application file for complete search history.

(56) References Cited

U.S. PATENT DOCUMENTS

| | | |
|---|---|---|
| 5,835,104 A | 11/1998 | Hicok et al. |
| 6,301,258 B1 | 10/2001 | Katseff et al. |
| 6,405,256 B1 | 6/2002 | Lin et al. |

(Continued)

FOREIGN PATENT DOCUMENTS

| | | |
|---|---|---|
| EP | 2073486 A1 | 6/2009 |
| JP | 2004128658 A2 | 4/2004 |
| WO | 2014124753 A1 | 8/2014 |

OTHER PUBLICATIONS

"Predictive Buffering for Streaming Video in 3G Networks" Varun Singh et al. 978-1-4673-1239-4/12, 2012 IEEE.

(Continued)

*Primary Examiner* — Margaret G Mastrodonato
(74) *Attorney, Agent, or Firm* — Holzer Patel Drennan

(57) ABSTRACT

Embodiments relate to systems and methods for modifying the transmission rate of media data in order to improve craft-based media playback system performance during handover events in a communication system.

22 Claims, 7 Drawing Sheets

(51) Int. Cl.
*H04L 12/835* (2013.01)
*B64D 11/00* (2006.01)

(56) References Cited

U.S. PATENT DOCUMENTS

| | | |
|---|---|---|
| 6,442,385 B1 | 8/2002 | Marko |
| 6,625,656 B2 | 9/2003 | Goldhor et al. |
| 7,237,254 B1 | 6/2007 | Katseff et al. |
| 7,536,469 B2 | 5/2009 | Chou et al. |
| 7,594,025 B2 | 9/2009 | Colville et al. |
| 7,707,614 B2 | 4/2010 | Krikorian et al. |
| 8,185,611 B2 | 5/2012 | Price |
| 8,370,887 B2 | 2/2013 | Virdi et al. |
| 8,391,896 B2 | 3/2013 | Curcio et al. |
| 8,917,207 B2 | 12/2014 | Frisco et al. |
| 9,058,324 B2 | 6/2015 | Kohlenberg et al. |
| 9,462,230 B1 | 10/2016 | Agrawal et al. |
| 9,648,088 B1 | 5/2017 | Pande et al. |
| 2002/0170060 A1 | 11/2002 | Lyman |
| 2003/0152093 A1 | 8/2003 | Gupta et al. |
| 2006/0030311 A1 | 2/2006 | Cruz et al. |
| 2007/0204056 A1 | 8/2007 | Deshpande |
| 2009/0318139 A1 | 12/2009 | Su |
| 2010/0121977 A1 | 5/2010 | Kontola et al. |
| 2011/0047285 A1 | 2/2011 | Kampmann et al. |
| 2011/0149906 A1 | 6/2011 | Hong et al. |
| 2012/0009890 A1 | 1/2012 | Curcio et al. |
| 2014/0095943 A1 | 4/2014 | Kohlenberg et al. |
| 2014/0226560 A1 | 8/2014 | Parron et al. |
| 2015/0049602 A1* | 2/2015 | Gavita ............... H04W 4/029 370/229 |
| 2017/0063959 A1 | 3/2017 | Izquierdo et al. |
| 2018/0020384 A1 | 1/2018 | Sleight |

OTHER PUBLICATIONS

"Geo-Predictive Real-Time Media Delivery in Mobile Environment" Curcio et al. ACM Digital Library, http://dl.acm.org/citation.cfm?id=1878039 printed Aug. 5, 2015.

"Netflix on a Plane—Streaming Works at 30,000 Feet", John Porter and Lizzie Russo, Hacking Netflix, Jul. 13, 2010 http://www.hackingnetflix.com/2017/07/netflixstreamingworksonairplanes.html.

* cited by examiner

VARIABLE SIZE LINEAR VIDEO CONTENT BUFFERS FOR UNINTERRUPTED HANDOVER IN A MULTI-BEAM SATELLITE SYSTEM

CROSS REFERENCE TO RELATED APPLICATIONS

This application is a continuation of U.S. application Ser. No. 16/579,423, entitled "VARIABLE SIZE LINEAR VIDEO CONTENT BUFFERS FOR UNINTERRUPTED HANDOVER IN A MULTI-BEAM SATELLITE SYSTEM" filed on Sep. 23, 2019, which claims priority as a continuation application under 35 U.S.C. § 120 to U.S. patent application Ser. No. 15/258,846 entitled "VARIABLE SIZE LINEAR VIDEO CONTENT BUFFERS FOR UNINTERRUPTED HANDOVER IN A MULTI-BEAM SATELLITE SYSTEM" filed on Sep. 7, 2016, the entirety of which is incorporated by reference herein.

BACKGROUND

Embodiments relate generally to communication systems, and, more particularly, to providing uninterrupted streaming media to media clients in a craft during communication system handover events.

Crafts may include storage-based media systems that store media content items on a server located on the craft; for example, on an aircraft, watercraft, train, automobile, or the like. Users on such a craft (e.g., passengers on an airplane) may access the stored media content items through media clients, such as handheld or seat-back media clients. Generally, such storage-based media systems are not affected by the craft moving between communication links while in transit because the media offered to users is stored locally on the craft. However, those same systems are limited to providing media already stored on the craft-based server before departure.

Crafts may also include systems that provide users with access to remote media sources, such as the Internet or other content sources via one or more wireless communication systems while in transit. However, movement between communication system coverage areas while in transit may negatively affect the ability to provide uninterrupted streaming media content to users.

SUMMARY

In a first embodiment, a method for providing media content to a media client on a craft, comprises: initiating a first streaming media session with a remote media server using a first communication link; receiving linear media data associated with the first streaming media session from a remote media buffer associated with the remote media server and at a first transmission rate over the first communication link; buffering the linear media data associated with the first streaming media session and received at the first transmission rate in a local media buffer at a first buffer size; providing buffered linear media data associated with the first streaming media session and received at the first transmission rate from the local media buffer for consumption on the media client; prior to an expected link transition initiation time between the first communication link and a second communication link, increasing buffering of the received linear media data in the local media buffer from the first buffer size to a second buffer size by receiving, at a second transmission rate over the first communication link, linear media data associated with the first streaming media session from the remote media buffer, the second transmission rate being higher than the first transmission rate; and providing, during a link transition time associated with the expected link transition initiation time, buffered linear media data associated with the first streaming media session and received at the second transmission rate from the local media buffer for consumption on the media client.

In some embodiments of the method, the method further comprises: transmitting to the remote media server a first instruction to increase the first transmission rate to the second transmission rate over the first communication link.

In some embodiments of the method, the method further comprises: receiving linear media data associated with the first streaming media session from the remote media buffer associated with the remote media server and at the first transmission rate over the first communication link before the expected link transition initiation time and after the local media buffer reaches the second buffer size.

In some embodiments of the method, the method further comprises: initiating a second streaming media session with the remote media server using a second communication link after the link transition time; and receiving linear media data associated with the second streaming media session from the remote media buffer associated with the remote media server over the second communication link.

In some embodiments of the method, the method further comprises: determining an expected link transition duration between the first communication link and the second communication link; and determining the second buffer size based on the expected link transition duration.

In some embodiments of the method, the method further comprises: determining the expected link transition initiation time between the first communication link and a second communication link.

In a second embodiment, a system for providing media content to a media client on a craft, comprises: a memory comprising computer-executable code; a local media buffer; a transceiver; at least one processor in data communication with the local media buffer, the transceiver, and the memory, and configured to execute the computer-executable code and cause the system to: initiate a first streaming media session with a remote media server via the transceiver using a first communication link; receive, via the transceiver, linear media data associated with the first streaming media session from a remote media buffer associated with the remote media server and at a first transmission rate over the first communication link; buffer the linear media data associated with the first streaming media session and received at the first transmission rate in the local media buffer at a first buffer size; provide buffered linear media data associated with the first streaming media session and received at the first transmission rate from the local media buffer for consumption on the media client; prior to an expected link transition initiation time between the first communication link and a second communication link, increase buffering of the received linear media data in the local media buffer from the first buffer size to a second buffer size by receiving, via the transceiver, at a second transmission rate over the first communication link, linear media data associated with the first streaming media session from the remote media buffer, the second transmission rate being higher than the first transmission rate; and provide, during a link transition time associated with the expected link transition initiation time, buffered linear media data associated with the first streaming media session and received at the second transmission rate from the local media buffer for consumption on the media client.

In some embodiments of the system, the system is further configured to: cause the system to: transmit to the remote media server, via the transceiver, a first instruction to increase the first transmission rate to the second transmission rate over the first communication link.

In some embodiments of the system, the system is further configured to: cause the system to: receive, via the transceiver, linear media data associated with the first streaming media session from the remote media buffer associated with the remote media server and at the first transmission rate over the first communication link before the expected link transition initiation time and after the local media buffer reaches the second buffer size.

In some embodiments of the system, the system is further configured to: initiate a second streaming media session with the remote media server via the transceiver using a second communication link after the link transition time; and receive, via the transceiver, linear media data associated with the second streaming media session from the remote media buffer associated with the remote media server over the second communication link.

In some embodiments of the system, the system is further configured to: determine an expected link transition duration between the first communication link and the second communication link; and determine the second buffer size based on the expected link transition duration.

In some embodiments of the system, the system is further configured to: cause the system to: determine an expected link transition initiation time between the first communication link and a second communication link.

In some embodiments of the method and system, the second buffer size is configured so that the local media buffer will not be depleted during the link transition time.

In some embodiments of the method and system, the first communication link is a first satellite communication link.

In some embodiments of the method and system, the second communication link is a second satellite communication link.

In some embodiments of the method and system, the second communication link is an air-to-ground communications link.

BRIEF DESCRIPTION OF THE DRAWINGS

The present disclosure is described in conjunction with the appended figures.

Figure 1:
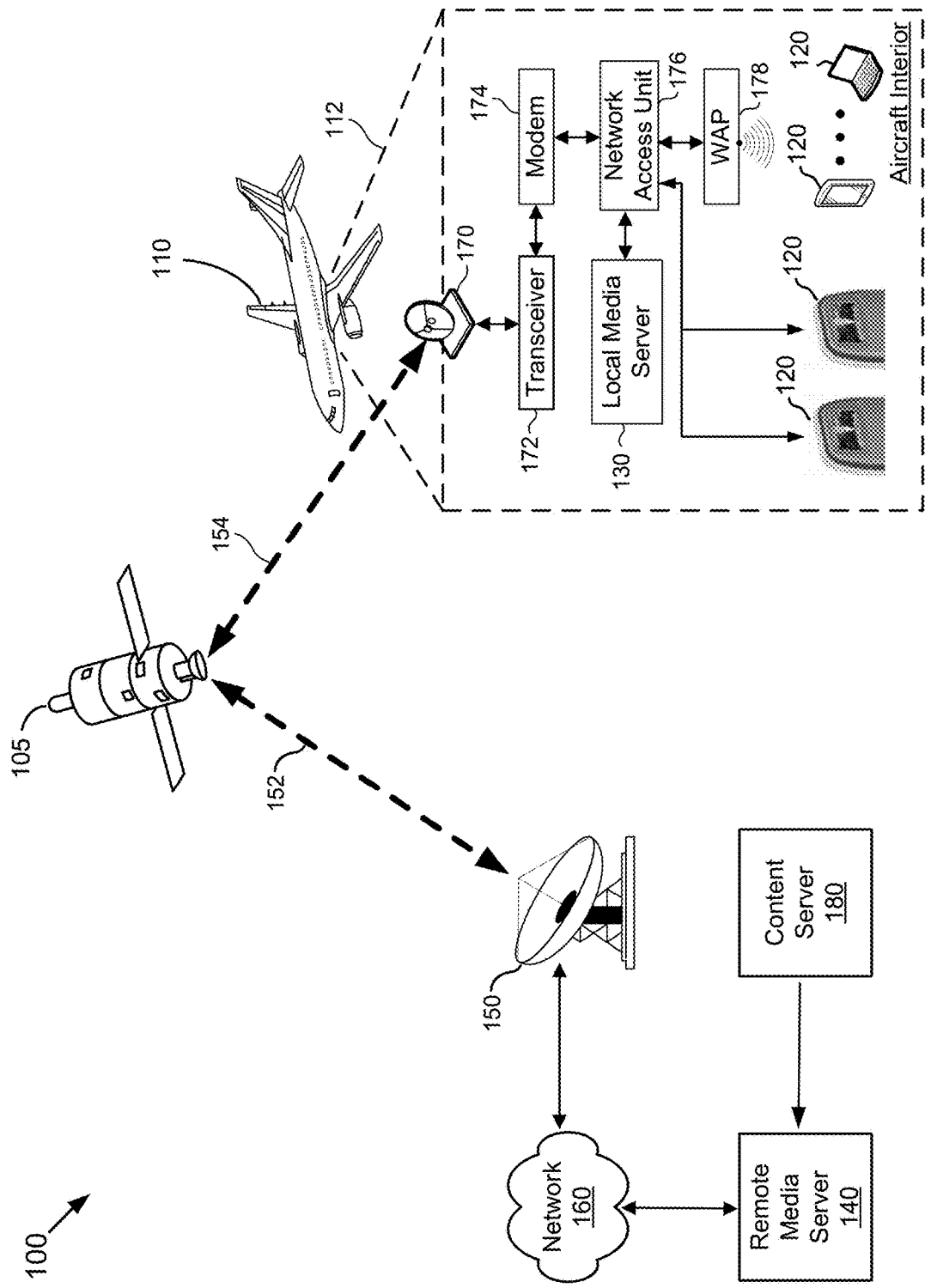
FIG. 1 shows a simplified diagram of a satellite communication system.

In the aforementioned figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Systems and methods are described herein for improving uninterrupted consumption of streaming linear media content by media clients on the craft during the handover between communication links. As described in more detail below, the systems and methods described herein utilize variable transmission rates of the linear media content to build-up a buffer on the craft in anticipation of handover, such that the buffer can be used to provide media content to the media clients during the time it takes to perform the handover. In doing so, the handover can be transparent to the users, as consumption of the linear media content is not interrupted or otherwise impacted during the handover. As used herein, linear media content generally refers to any stream of content that is scheduled for delivery at a certain time (e.g. a television show run at a set time, a live event, etc.). Thus, when a user decides to select, for example, a "channel" carrying linear media content, the user effectively elects to consume whatever scheduled media is playing on that channel at that time; as opposed to directly selecting the media content itself.

A two-way communication system in a craft may facilitate communication via a communication link (e.g., a satellite communication link) in order to provide access to sources accessible via remote networks such as the Internet, such as providing access to media content (e.g., streaming media content) to media clients associated with or otherwise in data communication with an in-transit media system. As the craft moves from place to place, it may need to move from one communication link to another communication link, for example when the craft reaches the extent of the coverage area of its current communication link. Moving between communication links involves handing over communication service of the craft from one communication link to another communication link. In some cases, those communications links may be within the same access network (e.g., moving between spot beams created by the same satellite) while in other cases those communications links may be within different access networks (e.g., between two different satellite networks). During the time it takes (referred to herein as a "link transition time") to perform such a handover, communication service with the craft is interrupted such that streaming media content from a remote source is temporarily unavailable to media clients on the craft. While the media clients may include a local storage that nominally buffers received data sufficient to handle short-term network variations, the nominal buffer may not be large enough to permit uninterrupted consumption by the user during a transition from one communication link to another communication link.

FIG. 1 depicts a simplified diagram of an example satellite communication system 100. Many other configurations are possible having more or fewer components than the satellite communication system 100 of FIG. 1. The satellite communication system 100 of FIG. 1 includes craft 110 in data communication with remote media server 140 via communication link 154, satellite 105, communication link 152, ground terminal 150, and network 160. Communication links 152 and 154 may enable a communication link between craft 110 and the remote media server 140. As depicted in FIG. 1, media can be obtained from remote media server 140 via network 160 and ground terminal 150 (and/or other terrestrial stations, gateways, or other network nodes).

While a single craft 110 (in this example, an airplane) is shown in communication via a single satellite 105 in FIG. 1, the techniques described herein can be applied in many other communication environments. For example, crafts capable of participating in the communication system shown in FIG. 1 may include: aircraft (e.g., airplanes, helicopters, blimps, balloons, etc.), trains, automobiles (e.g., cars, trucks, busses, etc.), watercraft (e.g., private boats, commercial shipping vessels, cruise ships, etc.) and others. Any or all such crafts may communicate via any one or more suitable communication system(s), including any suitable communication links, such as: a satellite communication system, an air-to-ground communication system, a hybrid satellite and air-to-ground communication system, a cellular communication system, and others. Because of the mobile nature of craft 110, the communication system will likely involve at least one wireless communication link, such as the aforementioned examples.

Ground terminal 150 may enable bidirectional communication with satellite 105. In some embodiments, ground terminal 150 may be known as a terrestrial station or a gateway. Ground terminal 150 is in data communication with network 160 and thereby to remote media server 140.

Craft 110 may include two-way communication system 112 to facilitate bidirectional communication with remote entities via satellite 105. In the example depicted in in FIG. 1, two-way communication system 112 includes antenna system 170, transceiver 172, modem 174, network access unit 176, wireless access point (WAP) 178, and a local media server 130. Two-way communication system 112 may receive a forward downlink signal from satellite 105 and transmit a return uplink signal to the satellite 105 via communication link 154.

Media clients 120 may include, for example, mobile devices such as personal electronic devices (e.g., smartphones, laptops, tablets, netbooks, and the like) brought onto craft 110 by passengers. As further examples, media clients 120 can also include fixed or on-craft devices, such as passenger seat-back systems or other devices on the craft 110. The media clients 120 may execute one or more applications that allow users on the craft 110 an interface for communicating with the remote content server 180 to obtain and consume linear media channels in a streaming (or progressively downloaded manner) via the satellite 105, ground terminal 150, and two-way communication system 112. The user may have the option to select/request one or more linear media channels from the interface. When a user selects a particular linear media channel for consumption, the media clients 120 may transmit a request for the selected linear media channel to local media server 130, which in turn may transmit the request to the remote media server 140. The users of the media clients 120 may for example be subscribers of a streaming media service provided by the remote content server 180. As another example, the remote content server 180 may not require a subscription to access the media content. As yet another example, the subscription to the remote content server 180 may be associated with the operator of the craft 110 and/or the operator of the communication system 100. Media clients 120 may communicate with the network access unit 176 via a communication link that can be wired and/or wireless (e.g., via wireless access point (WAP) 178). The communication link can be, for example, part of a local area network such as a wireless local area network (WLAN) supported by wireless access point (WAP) 178. One or more wireless access points 178 may be distributed about the craft 110 and may, in conjunction with network access unit 176, provide traffic switching and routing functionality.

Network access unit 176 may provide uplink data received from media clients 120 and local media server 130 to modem 174 to generate modulated uplink data (e.g., a transmit intermediate frequency (IF) signal) for delivery to transceiver 172. Transceiver 172 may then up-convert and amplify the modulated uplink data to generate a return uplink signal of the communication link 154 for transmission to satellite 105 via antenna system 170. Similarly, transceiver 172 may receive the forward downlink signal from satellite 105 via antenna system 170. Transceiver 172 may also amplify and down-convert the forward downlink signal to generate modulated downlink data (e.g., a receive IF signal) for demodulation by the modem 174. The demodulated downlink data from modem 174 may be provided to network access unit 176 for routing to media clients 120 and local media server 130. In some embodiments, modem 174 is integrated with network access unit 176, while in others, modem 174 is a separate component.

As described in more detail below, local media server 130 can receive requests for selected linear media channels from media clients 120 and forward the requests to network access unit 176 for subsequent transmission to remote media server 140. Local media server 130 is also configured to receive and buffer linear media channel data associated with the selected linear media channels and provide the buffered linear media channel data to the requesting media clients 120. Local media server 130 can provide for on-board media distribution and can include one or more media servers, media storage devices, etc. The functions of local media server 130 can be implemented in hardware, instructions embodied in memory and formatted to be executed by one or more general or application-specific processors, firmware, or any combination thereof In the example depicted in FIG. 1, local media server 130 is shown as a separate device. Alternatively, some or all of the components or features of local media server 130 may be implemented within one or more other components of two-way communication system 112. Network access unit 176 may also enable media clients 120 to access one or more additional servers (not shown) located in craft 110, such as a server storing in-flight entertainment media.

Network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein. Further, network 160 can include both wired (e.g., copper and optical) and wireless (e.g., radio and microwave) connections.

Remote media server 140 may provide various types of media content, such as linear media channels (e.g., linear audio and/or video media) available from content server 180. Linear media data generally refers to any stream of content that is scheduled for delivery at a certain time (e.g. a television show run at a set time, a live event, etc.). Thus, when a user decides to select, for example, a "channel" carrying linear media content, the user effectively elects to consume whatever scheduled media is playing on that channel at that time; as opposed to directly selecting the media content itself and initiating the media content item to begin playing at the beginning. For example, a user may select to watch a televised broadcast provided to the media playback system 130 from the remote content server 180. The functions of the remote media server 140 can be implemented in hardware, instructions embodied in memory and formatted to be executed by one or more general or application-specific processors, firmware, or any combination thereof.

Remote media server 140 may also provide non-linear programming (e.g., video on demand), which may be available on-demand to media clients 120. Both linear and non-linear media content can be communicated from remote media server 140 to media clients 120 (e.g., in response to requests for such media from the media clients 120), while in flight, via satellite 105 and local media server 130. Although only one remote media server 140 and remote content server 180 is depicted in FIG. 1 for simplicity, media clients 120 may receive content from one or more remote media servers 140, which may in-turn receive media data from one or more content servers 180.

Content server 180 may provide a variety of media types, including streaming media content. In some embodiments, the streaming media may be linear media content. For example, various broadcast television channel offerings may be available from the content server 180. While FIG. 1 only shows a single content server 180 in data communication with remote media server 140, in other embodiments multiple content servers may be in data communication with remote media server 140. For example, multiple network television providers may provide media content, such as linear media content, to remote media server 140.

Figure 2:
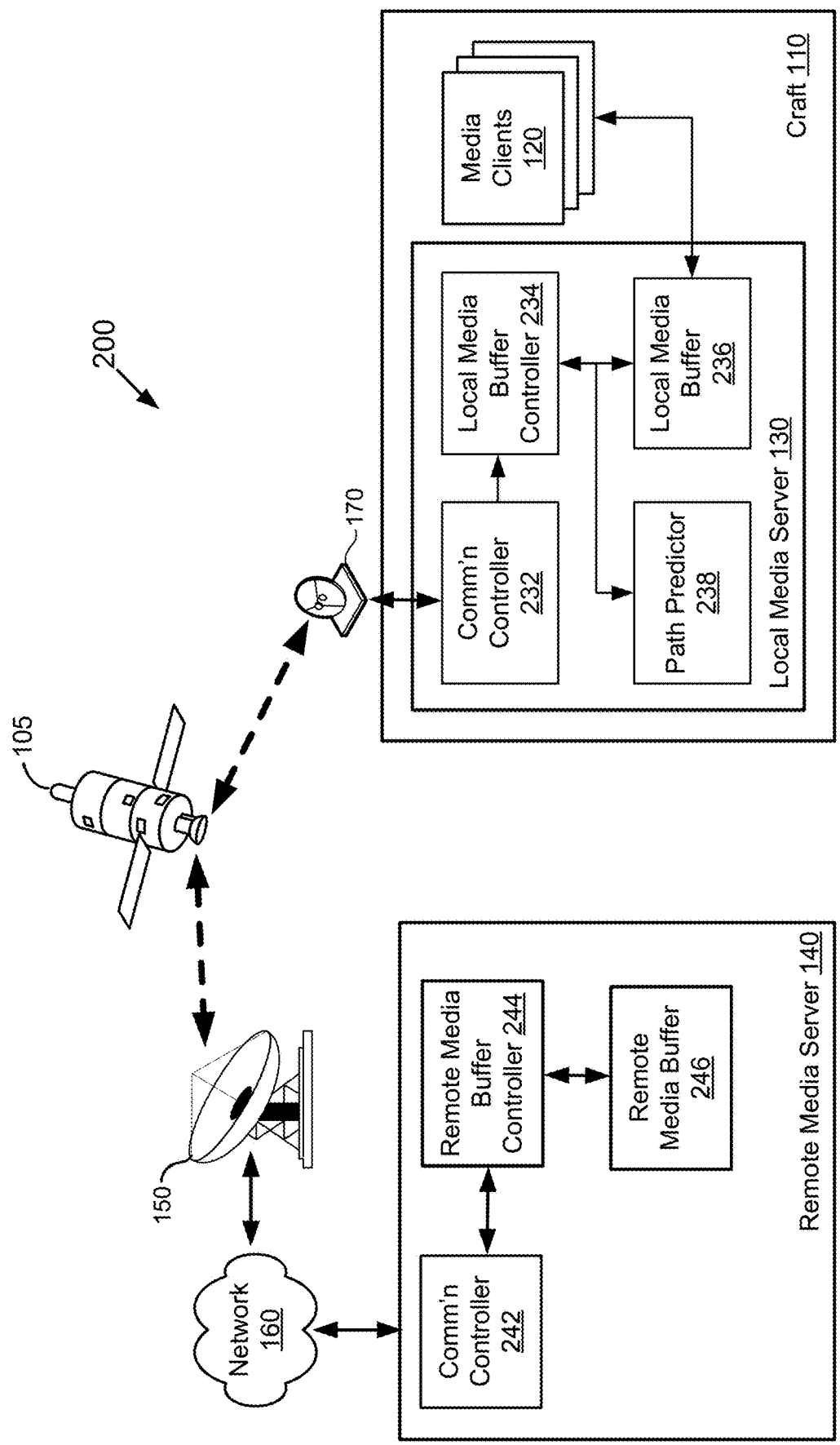
FIG. 2 shows a simplified diagram of aspects of a media delivery system.

FIG. 2 depicts a block diagram of an illustrative media delivery system 200 according to various embodiments. Many other configurations are possible having more or fewer components. Moreover, the functionalities described herein can be distributed among the components in a different manner than described herein. Embodiments of the media delivery system 200 may be implemented using components of the communication system described with reference to FIG. 1. However, in FIG. 2 and the following discussion, some components of the two-way communication system discussed above with respect to FIG. 1 (e.g., antenna system 170, transceiver 172, modem 174, network access unit 176, and WAP 178) are omitted for clarity.

As depicted in FIG. 2, local media server 130 in craft 110 is in communication with a remote media server 140 via satellite 105 (or other suitable communication network, as described above). Local media server 130 is also is in communication with multiple media clients 120 in craft 110. As used herein, describing local media server 130 and/or media clients 120 as "in" craft 110 is intended to include any suitable location of those components, so that the components move along with craft 110. Further, the functions of local media server 130 can be implemented in hardware, instructions embodied in a memory and formatted to be executed by one or more general or application-specific processors, firmware, or any combination thereof.

Embodiments of local media server 130 may include a craft-side communication controller 232, a local media buffer controller 234, and a local media buffer 236.

The craft-side communication controller 232 facilitates communication via the network access unit (not shown) to enable uninterrupted streaming of linear media content provided by the content server 180 to the client devices using the techniques described herein. The craft-side communication controller 232 may offer linear media content that is available from the remote content server 180 for selection by users of the media clients 120. The craft-side communication controller 232 may then receive requests for linear media content from the media clients and initiate streaming sessions of the requested linear media content with the remote content server 180 via remote media server 140 on behalf of the media clients 120.

Local media buffer controller 234 may receive data from the communication controller 232, such as streaming media data, and direct the received data to a local data storage, such as local media buffer 236. Local media buffer controller 234 may also direct local media buffer 236 to provide media data to one or more media clients 120 in craft 110. Further, local media buffer controller 234 may monitor the status of local media buffer 236 with respect to one or more media streams. For example, local media buffer controller 234 may monitor the amount of data stored in local media buffer 236 for the one or more media streams. The amount of data stored may be expressed, for example, in data units (e.g., megabytes) or in terms of time units (e.g., minutes).

Local media buffer 236 may comprise a memory for storing media data on craft 110. For example, local media buffer may comprise one or more hard disk drives, solid state drives, random access memory modules, or the like. In the illustrated embodiments, the local media buffer 236 is a part of a local media server. In some alternative embodiments, the local media buffer 236 may be storage on one or more media clients. In yet other alternative embodiments, the local media buffer 236 may be distributed between the local media server 130 and the media clients 120.

Local media server 130 may include a path predictor 238, which may predict some or all of a path for a craft, such as craft 110, based on, for example, origin and destination (e.g., city pair), current or planned trajectory, flight schedules, flight plans, flight trends, and other ways. Local media server 130 may use path predictor 238 in order to determine when a craft is predicted to be within one or more communication coverage areas. For example, path predictor 238 may determine based on a craft's current heading and speed that a craft will be in a first communication coverage area for a period of time followed by a second communication coverage area for another period of time. In this way, path predictor 238 may also be able to determine when a communications transition is expected to occur. The path predictor 238 is depicted in FIG. 2 as part of local media server 130 in the illustrated embodiment. In some alternative embodiments, the path predictor 238 may be a part of a ground system, such as ground terminal 150 or remote media server 140. In some embodiments, path prediction for craft 110 may be performed by ground terminal 150 and local media server 130 or craft 110 collectively. For example, craft 110 may include equipment that provides positional information such as a global positioning system (GPS) and an internal reference unit (IRU) that provide current location, heading, and speed information to path predictor 238. The path predictor 248 may also store (or otherwise obtain) data indicating the coverage areas of various communication links available for use in communicating with the craft 110. The path predictor 248 can then use the positional information of the craft 110 and the coverage areas of the various communication links to determine when expected communication transitions may occur.

Embodiments of the remote media server 140 may include a communication controller 242, a remote media buffer controller 244, and a remote media buffer 246.

Communication controller 242 may enable a communication link between remote media server 140 and a communication system, such as a satellite communication link with satellite 105, by way of network 160 and gateway 150 in this example. Further, communication controller 242 may include or have access to data regarding communication coverage areas. For example, communication controller 242 may include data regarding the coverage area of various satellite spot beams.

Remote media buffer controller 244 may receive data from communication controller 242, such as streaming media data, from a content server (not shown), and direct the received data to a data storage, such as remote media buffer 246. Remote media buffer controller 244 may also direct media buffer 246 to provide media data to one or more crafts, such as craft 110, via the communication link with that craft. Further, remote media buffer controller 244 may monitor the status of remote media buffer 246 with respect to one or more media streams, for example, the amount of data stored in the media buffer for the one or more media streams.

Remote media buffer 246 may comprise a memory for storing media data. For example, remote media buffer 246 may comprise one or more hard disk drives, solid state drives, random access memory modules, or the like. In the illustrated embodiments, the remote media buffer 246 is a part of the remote media server 140. In alternative embodiments, the remote media buffer 246 may be external to the remote media server. As described in more detail below, the remote media buffer 246 is used in conjunction with the local media buffer 236 to provide uninterrupted streaming of linear media content to media clients 120. In embodiments, the remote media buffer 246 nominally stores more media data than the local media buffer 236. In particular, the remote media buffer 246 may be sized so that it can, in anticipation of handover, be used to provide enough data to the local media buffer 236 prior to the handover, such that the local media buffer 236 can provide uninterrupted streaming to the media clients 120 during the time it takes to perform the handover. In embodiments, only the linear media channels that have been selected by a user on the craft 110 (or other craft, other terminal sharing the same communication link 154) are transmitted over the communication link 154. This can provide more efficient utilization of the communication link 154, as compared to providing all the available linear media channels regardless of whether a channel has been requested. The use of the remote media buffer 246 can further improve the efficient utilization of the communication link 154, as compared to always transmitting and storing enough data in the local media buffer 236 to provide uninterrupted consumption during handover, regardless of whether a handover is anticipated. For example, upon request for a previously unrequested linear media channel for the craft 110, the local media server 234 may request that an amount of linear media data be provided by the remote media buffer 246 to fill the local media buffer 236 to a first (or nominal) buffer size that is sufficient to begin streaming to the requesting media client 120, but not be sufficient to provide uninterrupted streaming during handover. Because the user may stop requesting the linear media channel at any time, only filling the local media buffer 236 to the first buffer size can avoid frequent transmissions of a large amount of linear media data that may never be consumed.

In some instances, one or more remote media servers 140 may be in communication with one or more crafts 110 over one or more communication links (e.g., one or more satellite spot beams, etc.).

Local media buffer controller 234 may manage the transmission rate at which media data is transmitted to the craft 110 from the remote media server 140 via satellite 150, etc. For example, the local media buffer controller 234 may provide commands (or instructions) to the remote media server 140 to set the transmission rate to the craft 110 of buffered media data within the remote media buffer 246. As another example, the local media buffer controller 234 may provide commands to a media playback application executing on the media clients 120 indicating the transmission rate at which buffered media data within the remote media buffer 246 should be transmitted to the craft 110. As described in more detail below, the local media buffer controller 234 may receive information from the path predictor 238 regarding upcoming expected transitions between a first communication link and a second communication link. Based on the expected transition, the local media buffer controller 234 can cause an increase or decrease in the transmission rate of buffered media data from the remote media buffer 246 to the local media buffer 236, in order to manage the amount of buffered media data within the local media buffer 236. In particular, prior to the expected transition, the local media buffer controller 234 can cause the transmission rate to be higher than the playback rate at which media data is retrieved from the local media buffer 236 and provided to the media clients 120 for consumption. In other words, media data within remote media buffer 246 is transferred to the local media buffer 236 faster than the local media buffer 236 provides media data to the media clients 120. In doing so, the buffer size of the local media buffer 236 can increase, such that that the local media buffer 236 can be used to provide media content to the media clients 120 in an uninterrupted manner during the time it takes to perform the handover. In embodiments described herein, the local media buffer controller 234 manages the transmission rate at which media data is provided to the craft 110 via ground terminal 150 and satellite 105. In some other embodiments, the transmission rate may be managed by the remote media buffer controller 244. In yet other embodiments, the transmission rate may be managed by one or more components of the communication system 200.

Figure 3:
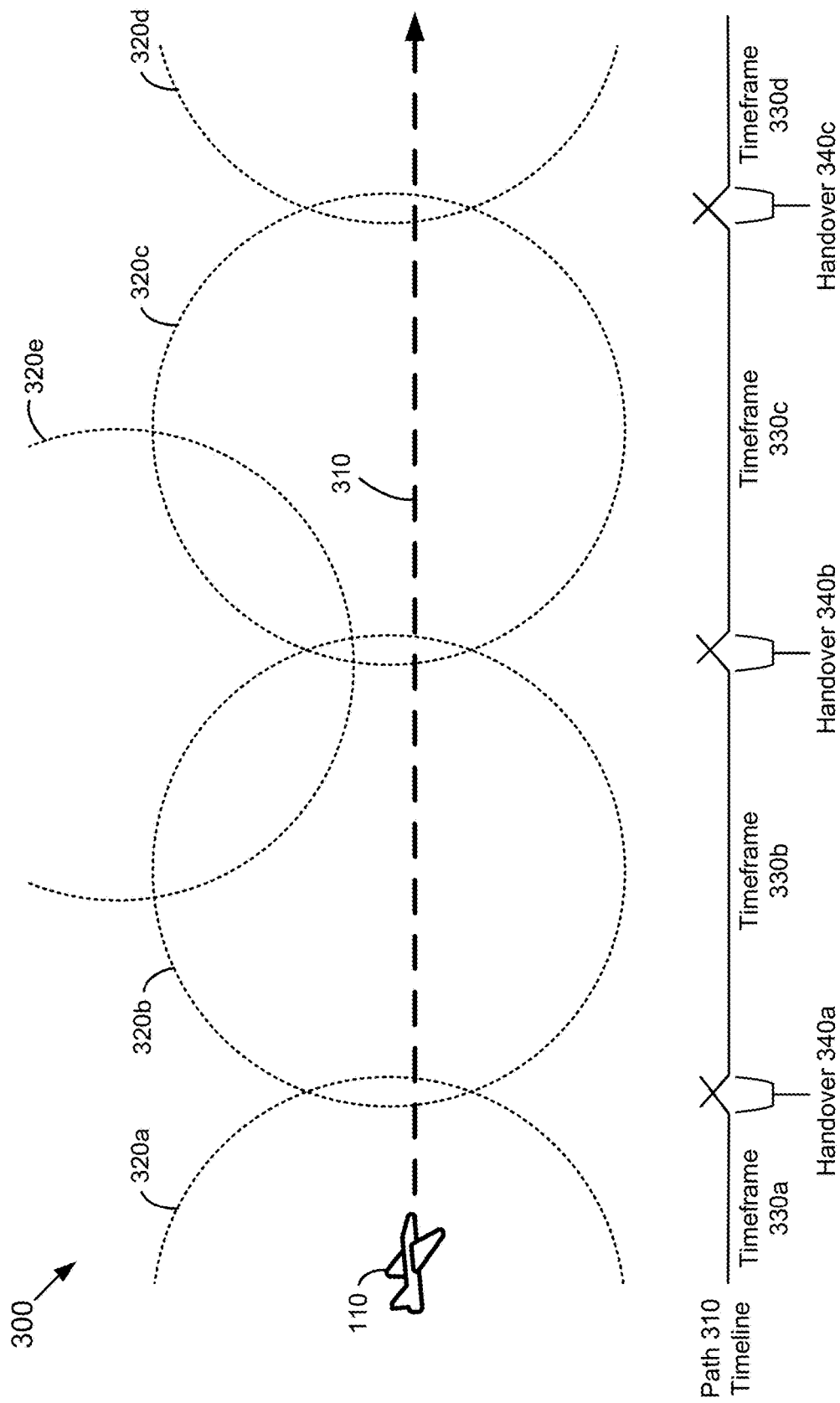
FIG. 3 shows a communication environment in which a craft may travel along paths through multiple communication coverage areas of a multi-link communication system.

FIG. 3 shows an illustrative communication environment 300 in which a craft 110 is traveling (i.e., in-transit) along a path, such as path 310, through multiple communication coverage areas 320*a-e* of different communication links of a communication system. For example, the communication system may be a multi-beam satellite communication system where one or more satellites, such as satellite 105 in FIGS. 1 and 2, having different beams servicing different geographic areas to provide respective communication links. As another example, the communication system may be a ground-based system where one or more cell towers maintain one or more communication links. As yet another example, the communication system may be a hybrid of ground and air-based communication systems.

For example, in FIG. 3, craft 110 may traverse first, second, third, and fourth communication coverage areas 320*a-d* (which are serviced by first, second, third, and fourth communication coverage areas, respectively) along path 310 during first, second, third, and fourth timeframes 330*a-d*.

Each time craft 110 moves from one communication coverage area to another communication coverage area, craft 110 is "handed over" to the new a new communication link in the new communication coverage area. For example, as craft 110 moves from one communication coverage area to another, craft 110 may set up a new communication link in the new communication coverage area.

A handover between communication links may include handing over between communication links in the same communication network or system, or it may include handing over between different communication networks or systems. Generally, a handover between communications links in the same communications network may be faster than those between disparate networks (though this may not always be the case). Thus, the problem of maintaining streaming data during handovers between disparate communication networks may be exacerbated.

In the illustrated example of the path 310 timeline, each handover 340a-c takes place during overlapping coverage of communication coverage areas 320a-d such that there are no locations along the path 310 outside all the communication coverage areas 320a-d. Nevertheless, the handover from one communication coverage area to another takes time, and therefore the availability of streaming media may be affected during any such handover period. In addition, more generally, a handover may be between communication links having overlapping or non-overlapping coverage areas. In other words, the length of the interruption of communication service to the craft 110 during a handover may include an outage time during which the craft 110 is outside the coverage areas of both communication links.

Generally, craft 110 will begin a transition from one communication link to another communication link at an actual link transition initiation time. the actual link transition initiation time may fall during a handover period, such as handover periods 340a-c and 360a. Where a craft follows a path, such as path 310, and is aware of the extent of the communication coverage areas, such as communication coverage areas 320a-d, the path predictor may determine an expected link transition initiation time (i.e., when the craft expects to begin the link transition between one communication link and another) and an expected link transition duration (i.e., the expected time to transition from one communication link to another). The expected link transition duration may be determined using various techniques. For example, the path predictor 238 may estimate the link transition duration based on previous handovers between the current communication link and the predicted next communication link by craft 110 and/or other crafts. As another example, the path predictor 238 may estimate the link transition duration based on the type of access network(s) that provide the current communication link and the predicted next communication link.

Moving from communication link to communication link, whether between communication links having overlapping coverage areas or having non-overlapping coverage areas, interrupts communication between the craft 110 and the remote media server 140. In some embodiments, the path predictor 238 may determine whether or not to initiate utilization of the variable transmission rate techniques described herein based on the length of time of the expected link transition duration. For example, the path predictor 238 may compare the length of time of the expected link transition duration to a threshold, and the local media server 130 may only increase buffering of the linear media content in the local media buffer 236 if the expected link transition duration exceeds a threshold. In some embodiments, the local media server 130 may only increase buffering if an upcoming transition if the transition is between communication links of different communication access networks (e.g., as determined by the path predictor 238). The link transition duration between communication links of the same communication access network may be significantly shorter than between communication links of difference communication access networks, such that the first buffer size of the local media buffer 236 is sufficient for providing uninterrupted streaming during the handover between communication links of the same communication access network. For example, the expected link transition duration between communication links of the same communication access network (e.g., different beams of the same satellite) may merely involve having the two-way communication system acquire the signal of the new communication link, whereas handover between different communication access networks (e.g., different satellite networks) may involve repointing an antenna of the two-way communication system, acquiring the signal on the new communication link, and login and authentication (e.g., assignment of scheduled access) of the craft within the new communication access network.

Figure 4:
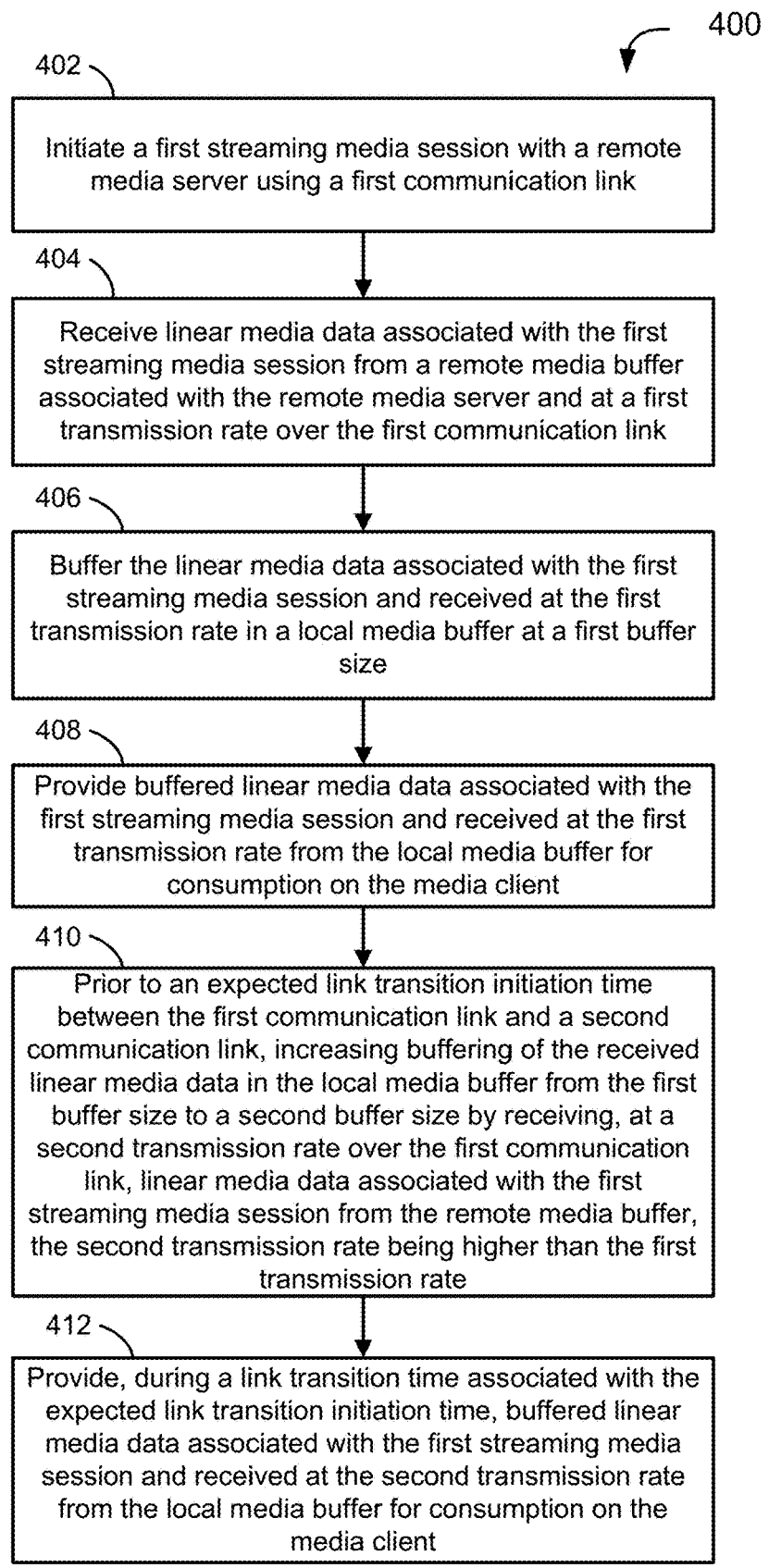
FIG. 4 shows aspects of a method for providing uninterrupted streaming media to media clients in a craft during communication system handover events.

FIG. 4 shows an embodiment of a method of providing uninterrupted streaming media to media clients on a craft during communication system handover events.

In step 402, a first streaming media session is initiated with a remote media server using a first communication link. For example, a communication controller of a local media server may initiate a communication link with a remote media server via a satellite communication system, such as that depicted in FIGS. 1 and 2. Other communication systems may also be used to establish the communication link as were described above.

In step 404, linear media data associated with the first streaming media session is received from a remote media buffer associated with the remote media server and at a first transmission rate over the first communication link. For example, linear media data such as a live TV broadcast of a sporting event may be received over a first satellite communication link as depicted in FIG. 2. The first transmission rate may be, for example, a frames per second (FPS) transmission rate. Note that the MB/s rate (data rate) could vary based on the FPS transmission rate. such as megabyte per second (MB/s).

In step 406, linear media data associated with the first streaming media session is buffered in a local media buffer at a first buffer size. For example, the linear media data may be buffered in local media buffer 236 via local media buffer controller 234 as depicted in FIG. 2. The first buffer size may refer to a variety of aspects of the buffer. For example, the buffer size may be expressed in time units of buffered media data, such as 1 minute of buffered media data. Alternatively, the buffer size may be expressed in size units of buffered media data, such as 100 megabytes of buffered media data. As yet another alternative, the buffer size may be expressed in video frame units, such as 60 frames. Other means of expressing the buffer size may be used.

Notably, buffer size may be a logical construct, and does not necessarily refer to a physical memory of an exact capacity. Rather, buffer size may be determined by, for example, the local media server and may be changed based on system needs. By way of example, a memory of an arbitrary size may have some portion of that memory, whether measured in size units (e.g., megabytes) or in equivalent time units, allocated to a media buffer, which may thus be called a media buffer of a first size. The allocation may subsequently be changed to address system needs such that the buffer is of a second size, where the second size may be greater than or less than the first size depending on the system needs.

In step 408, buffered linear media data associated with the first streaming media session and received at the first transmission rate is provided from the local media buffer for consumption on a media client. For example, the buffered linear media data may be provided from local media buffer 236 via to a media client 120, as depicted in FIG. 2.

The media may be provided to the media client at a playback rate, such as, a frame rate (e.g., 60 frames per second). Other media playback rates are possible. In some embodiments, the media playback rate will be related to the transmission rate of the media to the craft from the remote media server. For example, linear media data may be provided to the local media server from the remote media server at 60 frames per second, buffered, and then provided to the media clients at substantially the same rate of 60 frames per second. In this way, the buffer size may remain constant because the media data is being received at the same rate as it is being consumed.

In step 410, prior to an expected link transition initiation time between the first communication link and a second communication link, buffering of the received linear media data in the local media buffer may be increased from the first buffer size to a second buffer size by, for example, receiving linear media data associated with the first streaming media session from the remote media buffer over the first communication link at a second transmission rate higher than the first transmission rate. The expected link transition time may be determined using the techniques described above by the path predictor 248, as depicted in FIG. 2. Generally speaking, a particular transmission rate that is higher than another transmission rate means that more information is being transmitted per unit time. For example, a transmission rate of 100 FPS is higher than a transmission rate of 60 FPS. The particular transmission rate may vary over time and be higher than another transmission rate per unit time on a statistical basis, rather than an absolute basis.

In some embodiments, the method may include a step before step 410 of transmitting to the remote media server an instruction to increase the first transmission rate to the second transmission rate over the first communication link. For example, a craft nearing an expected link transition (e.g., handover) may transmit an instruction (or a command or message) to increase the transmission rate so that the local media buffer may be increased in size before the link transition. In other embodiments, the remote media server may increase the first transmission rate to the second transmission rate based on an expected link transition (e.g., based on a craft's planned path or actual path, as shown in FIG. 3) without an instruction from the craft. For example, the remote media server may be aware of the craft's present position, heading, and speed and determine based on the same the necessary time to begin a second transmission rate as well as what the second transmission rate should be.

The second transmission rate may be determined, for example, based on the expected link transition duration and the amount of time until the expected link transition initiation time. In other words, the second transmission rate may be determined such that the buffer size of the local media buffer on the craft will grow sufficiently large to be able to provide uninterrupted streaming media during an expected link transition duration, which may include a communication outage.

In some embodiments, the second transmission rate can be limited by initiating the second transmission rate sooner in order to allow the local media buffer to grow larger relative to its normal size over a longer period of time.

For example, the time required to build the buffer to a sufficient size to last during an expected link transition duration, which may also be referred to as the set-back time $t_s$, may be calculated based on the expected link transition duration $t_d$ (e.g., in seconds), the media playback rate (e.g., in frames per second) r, and the second transmission rate $tx_2$ (e.g., in frames per second) according to the following equation:

$$t_s \geq \frac{t_d}{\frac{tx_2}{r} - 1}$$

Further, the actual time $t_a$ to start the second transmission rate may be calculated based on the setback time $t_s$ and the expected link transition initiation time $t_i$ according to the following equation:

$$t_a = t_i - t_s$$

Using, for example, the equations above, the second transmission rate may be configured so that the media buffer will not be depleted during any expected link transition.

For example, given an expected link transition duration $t_d$ of 60 seconds, a media playback rate r of 60 FPS, and a second transmission rate $tx_2$ of 70 FPS, the setback time $t_s$ may be calculated as follows:

$$t_s \geq \frac{60 \text{ S}}{\frac{70 \text{ FPS}}{60 \text{ FPS}} - 1} \rightarrow t_s \geq 360 \text{ seconds}$$

And the time to start the decreased playback rate given an expected link transition initiation time $t_i$ of 12:00 may be calculated as follows:

$$t_a = t_i - t_s \rightarrow t_a = 12:00 - 360 \text{ seconds} \rightarrow t_a = 11:54$$

Other methods may be alternatively utilized. Further, the variables of the aforementioned equation may be rearranged to determine for example the second transmission rate instead of the required start time where the required start time is known instead.

In step 412, buffered linear media data associated with the first streaming media session and received at the second transmission rate from the local media buffer for consumption on the media client is provided during a link transition time associated with the expected link transition initiation time. In other words, the media data sent at an increased transmission rate in order to build the local media buffer is provided to the media client from the local media buffer during a link transition time. The link transition time is the time during which the craft is handing over from the first communication link to a second communication link, such that communication service to the craft is temporarily interrupted. Thus, during this time the local media buffer will decrease, as buffered linear media data is provided to a requesting media client but no additional linear media data is being added to the local media buffer. As a result, the size of the local media buffer during the link transition time will be reduced from the second buffer size to a third buffer size. The beginning of the link transition time may be different than the expected link transition initiation time determined by the path predictor, due to differences between the predicted path of the craft and the actual path of the craft.

Further embodiments of the method described with respect to FIG. 4 may include additional steps. For example, linear media data associated with the first streaming media session may be received from the remote media buffer associated with the remote media server at the first transmission rate over the first communication link before the expected link transition initiation time and after the local media buffer reaches the second buffer size. In other words, a safety margin or buffer may be used such that the local media buffer is filled with time to spare before the expected link transition duration. In this way, the second transmission rate may be reduced back to the first transmission rate (or some other transmission rate) before the link transition (for example, between steps 410 and 412 in FIG. 4).

As another example, a second streaming media session with the remote media server may be initiated using the second communication link after the link transition time and subsequently linear media data associated with the second streaming media session may be received from the remote media buffer associated with the remote media server over the second communication link (for example, after step 412 in FIG. 4). Although referred to herein as a second streaming media session for clarity purposes, in some embodiments the second streaming media session and the first streaming media session may both be part of the same streaming media session between the remote media server and a requesting media client. In other words, the streaming media session may be paused during the link transition time, and then resumed upon establishment of the second communication link. In some other embodiments, the first and second streaming sessions are separate streaming media sessions with the remote media server. In such a case, the first streaming media session may be terminated during the link transition time, and the second streaming media session may be setup upon establishment of the second communication link.

Figure 5:
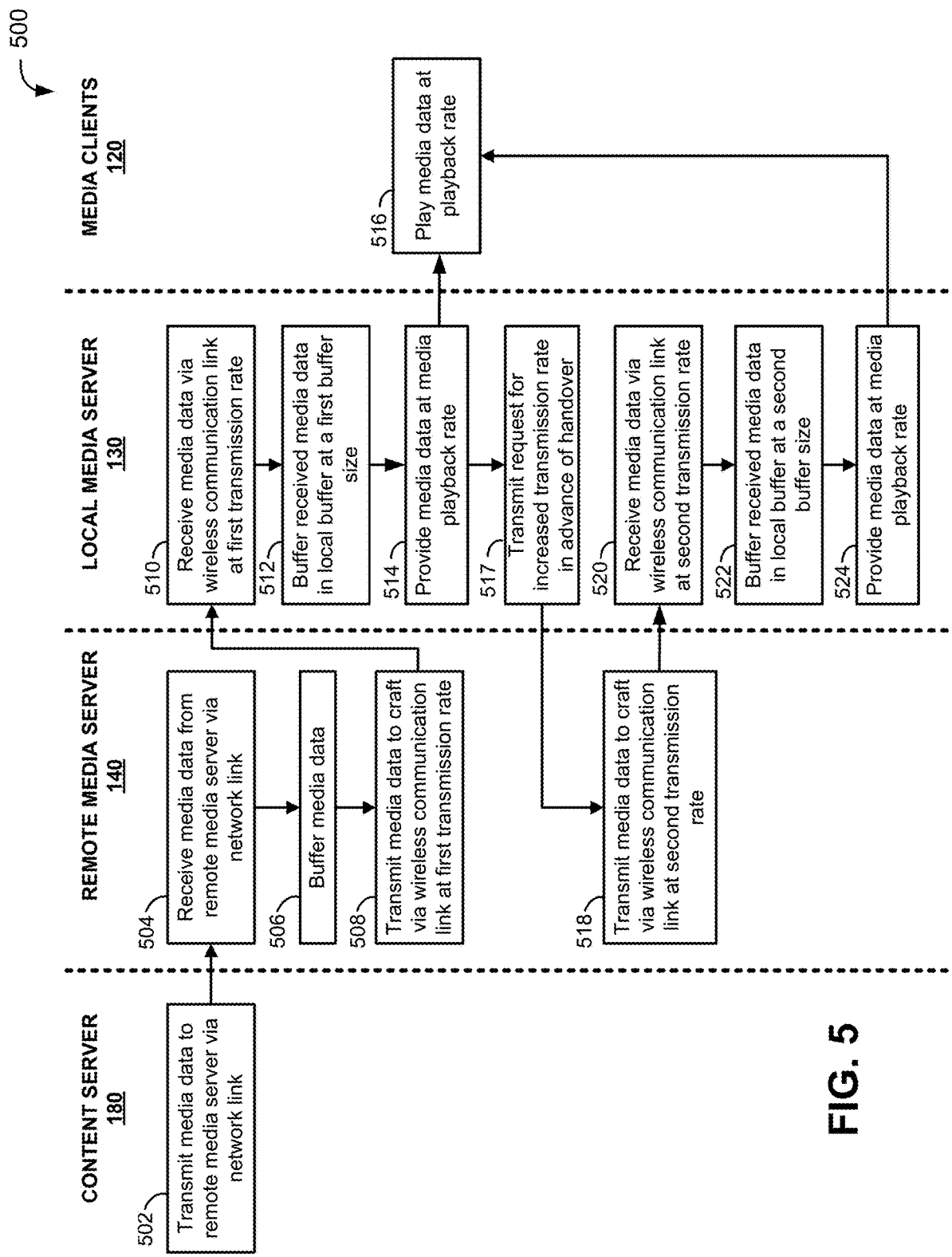
FIG. 5 shows a flow diagram of aspects of a system for providing uninterrupted streaming media to media clients in a craft during communication system handover events.

FIG. 5 shows a flow diagram 500 of aspects of a system for providing uninterrupted streaming media to media clients in a craft during communication system handover events.

At step 502, content server 180 transmits media data to remote media server 140 via a network link, such as network 160 in FIG. 1. The content may be, for example, linear media data such as live television media data.

At step 504, remote media sever 140 receives the media data from content server 180. As mentioned above, remote media server 140 may receive media data from a variety of content servers in addition to content server 180.

At step 506, remote media server 140 buffers the media data in a buffer local to remote media server 140. The buffer may be, for example, a memory, such as a random access memory, or a computer-readable storage media, such as a hard-disc, an array of hard-discs, or others.

At step 508, remote media server 140 transmits media data to a craft, such as craft 110 in FIG. 1. The streaming media session may be initiated by a message sent from the craft to remote media server 140 via the wireless communication link requesting access to media stored at remote media server 140. In other embodiments, remote media server 140 may initiate the transmission of media to the craft instead. For example, remote media server 140 may initiate the transmission when a scheduled event begins, such as a scheduled television program or a scheduled sporting event, or the like.

At step 510, local media server 130 on the craft receives the media data via the wireless communication link. As discussed above, in some embodiments the wireless communication link may be a satellite communication link. In such cases, the local media server may receive the media data via, for example, a carrier beam in the satellite communication system, where the carrier beam enables the communication link.

At step 512, local media server 130 on the craft buffers the received media data in a local buffer at a first buffer size. For example, the first size may be a buffer of 10 minutes of media data.

At step 514, local media server 130 provides media data to media clients 120 (e.g., seat-back entertainment units) at a media playback rate. As discussed above, the media playback rate may be substantially similar to the first transmission rate from remote media server 140 to local media server 130, for example, when the media data is linear media data.

At step 516, one or more local media client (e.g., media client 120 in FIG. 1) play the media data at the media playback rate.

In some embodiments, local media server 130 may transmit a request to the remote media server 140 for an increased transmission rate in advance of a handover as in step 517. For example, where local media server 130 includes a path predictor, such as path predictor 238 in FIG. 2, it may determine in advance of a handover that an increase in transmission rate is necessary to build the local media buffer to a sufficient level to have uninterrupted media playback during the handover. In some embodiments, a communications controller, such as communications controller 232 in FIG. 2, may be configured to determine the increased transmission rate. In particular, communications controller 232 may be configured to determine a second, increased transmission rate based on characteristics of a communication link transition, such as expected link transition initiation time and an expected link transition duration, as provided by, for example, the path predictor.

At step 518, prior to an expected communication link transition, remote media server 140 may increase the transmission rate of media date from a first transmission rate to a second transmission rate. For example, the transmission rate could be increased from 60 FPS (first transmission rate) to 80 FPS minutes (second transmission rate). As another example, the transmission rate may be increased from 1 MB/S (first transmission rate) to 1.5 MB/S (second transmission rate). In some embodiments, remote media server 140 may include a path predictor or may otherwise be aware of an expected handover and may increase the transmission rate based in advance of the expected handover.

At step 520, local media server 130 receives media data from remote media server 140 at a second transmission rate. For example, the second transmission rate may be higher than the first transmission rate in order to facilitate increasing a local media buffer size from a first buffer size to a second buffer size. In other words, the increased transmission rate allows the buffer to grow faster than the media clients are consuming the buffered media data.

At step 522, local media server 130 on the craft buffers the received media data in a local buffer at a second buffer size, larger than the first buffer size. For example, the second size may be a buffer of 15 minutes of media data as compared to the first size of 10 minutes (in step 512).

At step 524, local media server 130 provides media data to media clients 120 at the media playback rate.

Other steps not depicted in FIG. 5 are possible. For example, local media server 130 may send an instruction to remote media server 140 to increase the transmission rate from the first transmission rate to the second transmission rate. In response, remote media server 140 may increase the transmission rate before an expected link transition duration based on the craft's location. Alternatively, remote media server 140 may increase the transmission rate from the first transmission rate to the second transmission rate without an instruction from the craft. For example, remote media server 140 may increase the transmission rate before an expected link transition duration based on craft location information provided to remote media 130 by the craft or by another data service.

Figure 6:
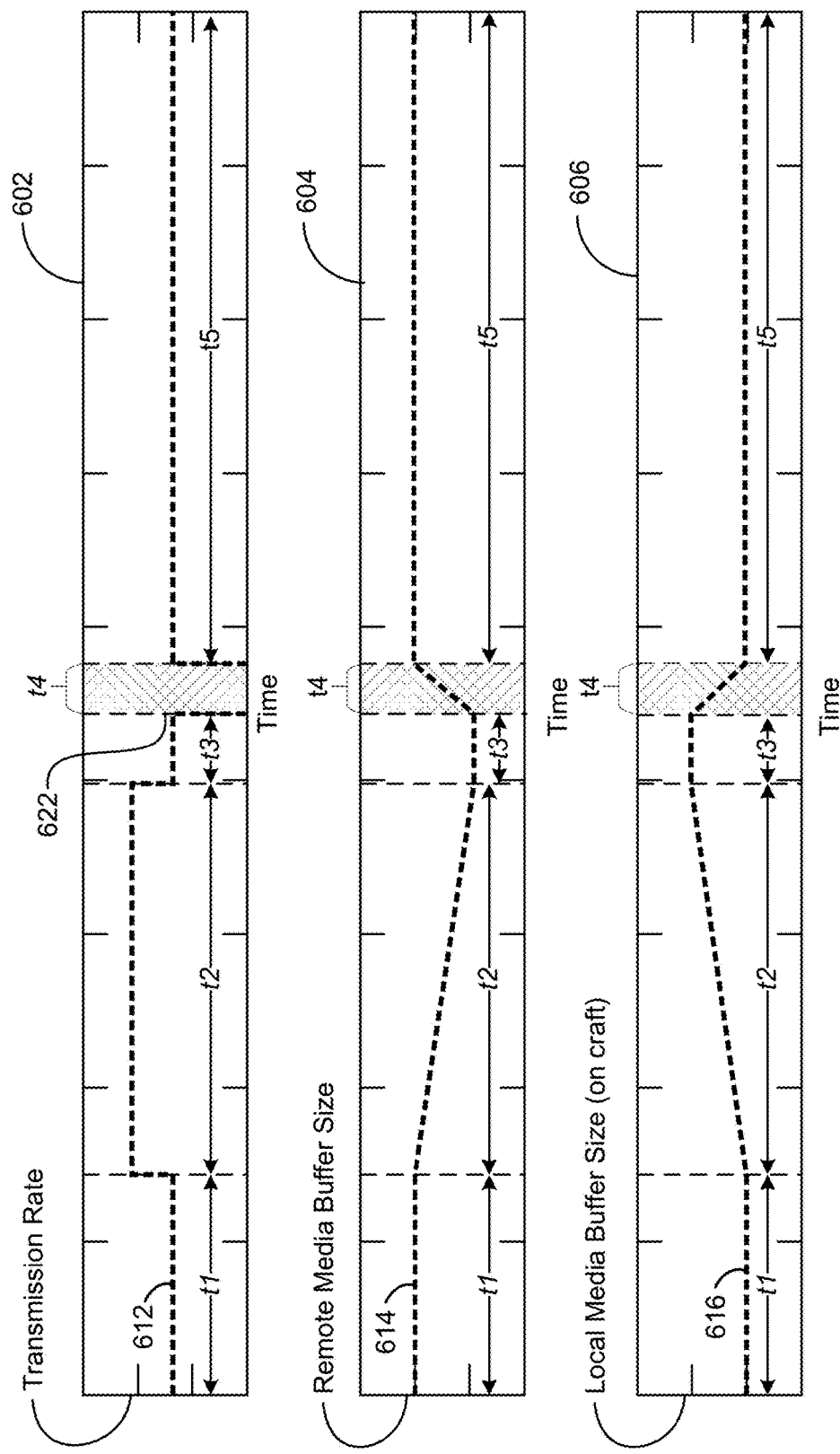
FIG. 6 shows graphs depicting various system performance aspects of a system for providing uninterrupted streaming media to media clients in a craft during communication system handover events.

FIG. 6 shows graphs depicting various system performance aspects of a system for providing uninterrupted streaming media to media clients in a craft during communication system handover events.

Graph 602 plots transmission rate 612 from a remote media server, such as remote media server 140 in FIG. 1, to a local media server on a craft, such as local media sever 130 on craft 110 in FIG. 1, against time. Graph 602 also indicates time intervals t1, t2, t3, t4, and t5, which are similarly indicated in graphs 604 and 606.

During time interval t1 of graph 602, the transmission rate, for example between a remote media server and a local media server on a craft, is at steady state. This transmission rate may be referred to as the first transmission rate for purposes of this example. The transmission rate may be measured in, for example, frames per second, or alternatively, in data rate (e.g., megabytes of media data per second). In some embodiments, the transmission rate may be equivalent or near equivalent with the transmission rate of the media content from a content source to the remote media server. For example, a live sporting event broadcast from a content source to the remote media server may be transmitted at an equivalent or near equivalent transmission rate (and it may also be buffered by the remote media server).

During time interval t2 of graph 602, the transmission rate, for example between the remote media server and the local media server on the craft, is increased to a second transmission rate, which is higher than the first transmission rate. In some embodiments, the beginning of time interval t2 may be considered a setback time, or a setback time plus an additional margin. For example, because the setback time may be the time necessary to increase the buffer size on the craft to sufficient size to last through a handover, the setback time may include an additional margin as a safety mechanism. In graph 602, time interval t3 may be considered this margin. Notably, in time interval t3 the transmission rate is back to the first transmission rate because the buffer has already achieved its target second buffer size during time interval t2 (during the increased transmission rate).

During time interval t4 of graph 602, the transmission rate drops to zero because the craft is transitioning (e.g., handing over) between one communication link and another during this period of time. Time 622 indicates the link transition initiation time that begins time interval t4. Time interval t4 may represent the time necessary to transition from the communication link associated with communication coverage area 320a to the communication link associated with communication coverage area 320b in FIG. 3.

During time interval t5 of graph 604, a new communication link is established so that media data may once again flow between the remote media server and the local media server on the craft. Thus, in time interval t5, the transmission rate 612 becomes non-zero once again. In this example, the transmission rate 612 in time interval t5 is the first transmission rate as in time interval a, but it need not be in other examples. For example, when transitioning from a relatively high-speed communication link, such as a satellite communication link, to a relatively slower communication link, such as an air-to-ground communication link, the transmission rate 612 after t4 may be lower than before. Alternatively, the transmission rate 612 after t4 may be higher than before when transitioning to a relatively higher-speed communication link. Once a new communication link is established after t4, the transmission rate may temporarily be set based on the local media buffer size (graph 606, discussed in more detail below) on the craft at the end of the handover. For example, if the local media buffer size at the end of handover is less than the first buffer size during time interval t1, the transmission rate may be temporarily set above the playback rate in order to increase the local media buffer size to the first buffer size. In contrast, if the local media buffer size at the end of handover is greater than the first buffer size, the transmission rate may be temporarily set below (e.g., remain at zero) the playback rate in order to reduce the local media buffer size to the first buffer size.

Graph 604 plots the size of a remote media buffer 614, such as remote media buffer 246 in FIG. 2, against time. During time interval t1, remote media buffer size 614 is at a steady state that may be referred to as a first buffer size, or alternatively a default or initial buffer size. The first buffer size may be measured, for example, in time units (e.g., 5 minutes) or in data units (e.g., 500 MB). The size of the remote media buffer may depend, for example, on the average handover time in a communications network, or as another example, the worst case handover time in the communication network. In other words, the remote media buffer may be sized so that it can provide enough data for a craft to fill its own local buffer to a sufficient size to play the media data uninterrupted during any handover without running out its own buffer. Notably, the size of the remote media buffer is not without consequence because the larger the buffer, the larger the latency between the content source and the content provided to a craft out of the remote media buffer. In the illustrated example, the remote media buffer size is shown as decreasing. This is because the media data in the remote media buffer is being transferred to the local media buffer on the craft, such that the "useful" data within the remote media buffer is decreasing from the perspective of the local media buffer. However, in some embodiments, the actual amount of data stored in the remote media buffer may not decrease during this time interval. In other words, the media data in the remote media buffer is copied to the local media buffer on the craft, without deleting the media data in the remote media buffer. In such a case, the remote media buffer can also provide the media data to other craft or other terminals serviced by the remote media system.

During time interval t2 of graph 604, the remote media buffer size decreases as a consequence of the increased transmission rate as depicted in graph 602. For example, the remote media server may be receiving data from a content source at a rate of 60 FPS, but transmitting at a rate of 80 FPS, thus decreasing the buffer size by 20 FPS.

During time interval t3 of graph 604, the remote media buffer size stabilizes because the transmission rate during this time has decreased back to the first transmission rate, as shown in graph 602.

During time interval t4 of graph 604, the remote media buffer size increases because the transmission rate to the media server on the craft goes to zero during the handover event. In the illustrated example, the remote media buffer size is shown as increasing. Similar to the discussion above, this is because the "useful" information within the remote media buffer is increasing from the perspective of the local media buffer on the craft. However, in some embodiments, the actual amount of data stored in the remote media buffer may not change during this time interval.

During time interval t5 of graph 604, the remote media buffer size stabilizes because the transmission rate has stabilized during this same period, as shown in graph 602. In this example, the remote media buffer size is shown as returning to the original remote media buffer size, but this need not always be the case. For example, the remote media buffer size during time interval t5 may be greater than or less than that during time interval t1. As yet another example, time interval t5 may have an increasing or decreasing buffer size depending on the rate at which the content source provides media data to the remote media server as compared to the rate at which the remote media server provides the media data to the local media server on the craft.

Graph 606 plots the size of a local media buffer 616, such as local media buffer 236 in FIG. 2, against time. During time interval t1, local media buffer size 616 is at a steady state that may be referred to as a first buffer size, or alternatively a default or initial buffer size. The first buffer size may be measured, for example, in time units (e.g., 5 minutes) or in data units (e.g., 500 MB). The size of the local media buffer may depend, for example, on the average handover time in a communications network, or as another example, the worst case handover time in the communication network. As explained above with respect to the remote media buffer, the size of the local media buffer is not without consequence because the larger the buffer, the larger the latency between the content source and the content provided to a craft out of the remote media buffer. This is especially true because the local media buffer has a larger latency than even the remote media buffer as compared to the actual content source.

During time interval t2 of graph 606, the local media buffer size increases as a consequence of the increased transmission rate as depicted in graph 602. For example, the local media server may be receiving data from the remote media server at a rate of 80 FPS, but only providing the media data to local media clients at a rate of 60 FPS, thus increasing the buffer size by 20 FPS.

During time interval t3 of graph 606, the local media buffer size stabilizes because the transmission rate during this time has decreased back to the first transmission rate, as shown in graph 602.

During time interval t4 of graph 606, the local media buffer size decreases because the transmission rate to the media server on the craft goes to zero during the handover event. While the transmission rate goes to zero, the craft is still providing media data to local media client via the local media buffer. Thus, streaming media data is uninterrupted despite the not receiving media data during the handover event.

During time interval t5 of graph 606, the local media buffer size stabilizes because the transmission rate has stabilized during this same period, as shown in graph 602. As above, in this example, the local media buffer size is shown as returning to the first local media buffer size, but this need not always be the case. For example, the local media buffer size during time interval t5 may be greater than or less than that during time interval t1. As yet another example, time interval t5 may have an increasing or decreasing local media buffer size depending on the rate at which the remote media server provides media data to the local media server as compared to the rate at which the local media clients on the craft consume the media data.

The examples described with respect to graphs 602, 604, and 606 in FIG. 6 are mere examples, and not limiting. Many different strategies may be employed with respect to the transmission rate in order to manipulate the buffer sizes at both the remote media server and the local media server and to improve user experience. In particular, not all steps described above need to be implemented.

Figure 7:
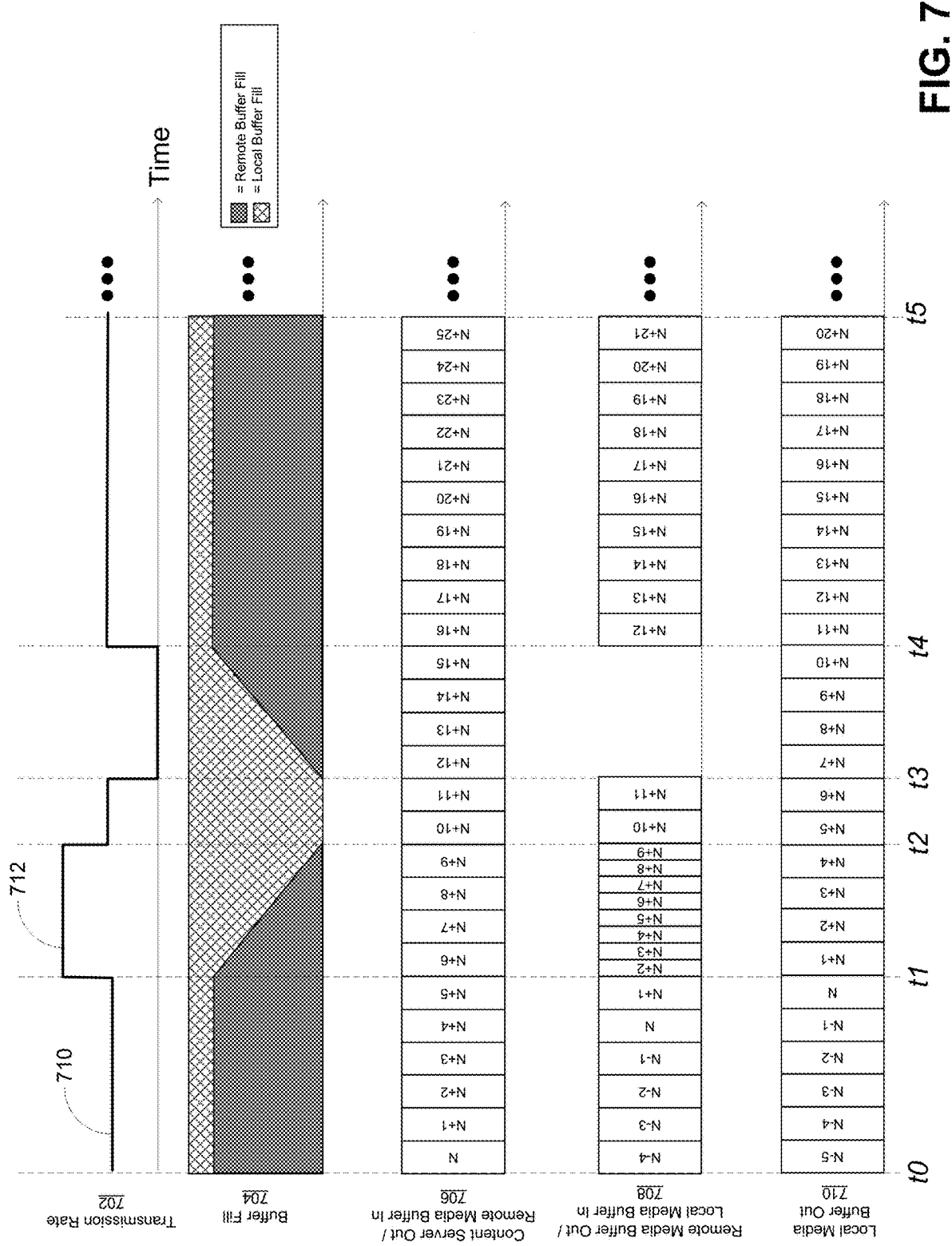
FIG. 7 shows graphs depicting additional system performance aspects of a system for providing uninterrupted streaming media to media clients in a craft during communication system handover events.

FIG. 7 shows graphs depicting additional system performance aspects of a system for providing uninterrupted streaming media to media clients in a craft during communication system handover events.

"Transmission Rate" 702 illustrates the rate of transmission of linear media content between, for example, a remote media server and a local media server over a communication link, such as depicted in FIG. 2. Between time t0 and t1, transmission rate 702 is at a first transmission rate 710. For example, the first transmission rate 710 could be a nominal transmission rate associated with linear media content being transmitted from a remote media buffer to a local media buffer on a craft.

"Buffer Fill" 704 comprises a remote buffer fill component (such as may be stored in remote media buffer 246 in FIG. 2) and a local buffer component (such as may be stored in local media buffer 236 in FIG. 2). Between time t0 and t1, buffer fill 704 comprises four segments of linear media data in the remote buffer fill component and one segment of linear media data in the local buffer fill component. The ration of remote buffer fill component to local buffer fill component (here 4:1) is exemplary and other ratios are possible.

"Content Server Out/Remote Media Buffer In" 706 illustrates the current segment of linear media content being sent from a content server (such as content server 180 in FIG. 2) to a remote media server (such as remote media server 140 in FIG. 2) at any particular time t. As illustrated, between time t0 and t1, linear media content segments N to N+5 are sent from the content server to the remote media server. In some embodiments, each segment N may be a ten second segment of linear media content.

"Remote Media Buffer Out/Local Media Buffer In" 708 illustrates the segments of linear media content being sent from the remote media server to a local media server (such as remote media server 130 in FIG. 2) at any particular time t. As illustrated in FIG. 7, the linear media content segment being transmitted to the local media server from the remote media server at any particular time t is four segments behind the real-time stream of linear media content being sent from the content server to the remote media server at the same time t. In the illustrated example, the remote media server keeps a nominal buffer fill of at least four segments of linear media content before sending any segments of linear media content to the local media server.

"Local Media Buffer Out" 710 illustrates the segments of linear media content being sent from the local media server to, for example, local media clients (such as media clients 120 in FIG. 2). As illustrated in FIG. 7, the linear media content segment being transmitted from the local media server to a media client at any particular time t is five segments behind the real-time stream of linear media content being sent from the content server to the remote media server at the same time t due to the buffering of linear media content segments at both the remote media server and the local media server. In the illustrated example, the local media server keeps a nominal buffer fill of at least one segment of linear media content before sending any segments of linear media content to the media.

Between t1 and t2, the transmission rate 702 is increased from the first transmission rate 710 to a second transmission rate 712, as shown, for example, in step 518 of FIG. 5. Because the transmission rate of linear media content segments from the content server to the remote media server remains unchanged between t1 and t2, the remote media server effectively transfers its buffer to the local media server. This is illustrated by the changing of the ratio of remote buffer fill to local buffer fill between t1 and t2. Further, "Remote Media Buffer Out/Local Media Buffer In" 708 illustrates that whereas only four segments of linear media content (N+6 to N+9) are transferred from the content server to the remote media server during this period, eight segments of linear media content (N+2 to N+9) are transferred from the remote media server buffer to the local media server buffer. This transfer of buffer content from the remote media server to the local media server prepares the remote media server to provide uninterrupted linear media content during the transmission outage between t3 and t4.

Between t2 and t3, the transmission rate 702 is returned to the first transmission rate 710. In the illustrated example, the first transmission rate 710 is equal to the transmission rate of linear media content from the content server to the remote media server. Thus, between t2 and t3, the ration of remote buffer fill to local buffer fill does not change. Further, during this time, the transmission of linear media content from the remote media server to the local media server is effectively real-time as compared to the transfer of the same content from the content server to the remote media server. However, during this time the transmission of linear media content segments from the local media server to the media clients remains five segments behind real-time.

Between t3 and t4, the transmission rate 702 drops to zero during a handover. During this time, the content server continues to send linear media content segments to the remote media server, but the remote media server is unable to send any linear media content segments to the local media server. As such, the ratio of remote buffer fill to local buffer fill changes during this time as the remote media buffer is refilled relative to the local media buffer.

Between t4 and t5, the transmission rate 702 returns to the first transmission rate. During this time, the ratio of remote buffer fill to local buffer fill returns to its nominal rate of four segments of remote buffer fill to one segment of local buffer fill.

Notably, during each of the time segments described above with respect to FIG. 7, the latency of linear media segment provided to the media client from the local media server as compared to the linear media segment provided to the remote media server from the content server remains the same (five segments or latency). This is because the remote media server is able to effectively shift its buffer to the local media server to be used during the handover. Thus, the consumption of linear media by the media clients is never interrupted during the handover.

The methods disclosed herein include one or more actions for achieving the described method. The method and/or actions can be interchanged with one another. In other words, unless a specific order of actions is specified, the order and/or use of specific actions can be modified.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In the present disclosure, certain terminology is used in the following ways. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like. The term "substantially" means that the recited characteristic, parameter, or value need not be achieved exactly, but that deviations or variations including, for example, tolerances, measurement error, measurement accuracy limitations and other factors, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for providing media content to a media client on a craft, comprising:
   initiating a first streaming media session with a remote media server using a first communication link;
   receiving linear media data associated with the first streaming media session from a remote media buffer associated with the remote media server and at a first transmission rate over the first communication link;
   buffering the linear media data associated with the first streaming media session and received at the first transmission rate in a local media buffer at a first buffer size;
   providing buffered linear media data associated with the first streaming media session and received at the first transmission rate from the local media buffer for consumption on the media client;
   identifying an expected link transition between the first communication link and a second communication link;
   determining whether the first communication link and the second communication link are on different communication access networks;
   if it is determined that the first communication link and the second communication link are on different communication access networks:
      increasing buffering of the received linear media data in the local media buffer from the first buffer size to a second buffer size prior to an expected link transition initiation time between the first communication link and a second communication link by receiving, at a second transmission rate over the first communication link, linear media data associated with the first streaming media session from the remote media buffer, the second transmission rate being higher than the first transmission rate;
      providing, during a link transition time associated with the expected link transition initiation time, buffered linear media data associated with the first streaming media session and received at the second transmission rate from the local media buffer for consumption on the media client; and
   if it is determined that the first communication link and the second communication link are not on different communication access networks:
      maintaining the first transmission rate over the first communication link and the first buffer size until the expected link transition; and
      providing buffered linear media from the local media buffer of the first buffer size during the link transition time.

2. The method of claim 1, further comprising:
transmitting to the remote media server a first instruction to increase the first transmission rate to the second transmission rate over the first communication link in response to determining that the first communication link and the second communication link are on different communication access networks.

3. The method of claim 1, further comprising:
receiving linear media data associated with the first streaming media session from the remote media buffer associated with the remote media server and at the first transmission rate over the first communication link before the expected link transition initiation time and after the local media buffer reaches the second buffer size.

4. The method of claim 1, further comprising:
initiating a second streaming media session with the remote media server using the second communication link after the link transition time; and
receiving linear media data associated with the second streaming media session from the remote media buffer associated with the remote media server over the second communication link.

5. The method of claim 1, wherein the second buffer size is such that the local media buffer will not be depleted during the link transition time when the first communication link and the second communication link are on different communication access networks.

6. The method of claim 1, wherein the first communication link is a first satellite communication link.

7. The method of claim 6, wherein the second communication link is an air-to-ground communications link.

8. The method of claim 1, further comprising:
determining an expected link transition duration between the first communication link and the second communication link; and
determining the second buffer size based on the expected link transition duration.

9. The method of claim 1, further comprising:
determining the expected link transition initiation time between the first communication link and a second communication link.

10. The method of claim 1, wherein the determining whether the first communication link and the second communication link are on different communication access networks is at least in part based on a path of the craft.

11. The method of claim 1, wherein the first communication link and the second communication link are determined to be on different communication access networks when the first communication link and the second communication link are on different satellite networks and the first communication link and the second communication link are determined not to be on different communication access networks when the first communication link and the second communication link are different beams of the same satellite.

12. A system for providing media content to a media client on a craft, comprising:
a memory comprising computer-executable code;
a local media buffer;
a transceiver;
at least one processor in data communication with the local media buffer, the transceiver, and the memory, and configured to execute the computer-executable code and cause the system to:
initiate a first streaming media session with a remote media server via the transceiver using a first communication link;
receive, via the transceiver, linear media data associated with the first streaming media session from a remote media buffer associated with the remote media server and at a first transmission rate over the first communication link;
buffer the linear media data associated with the first streaming media session and received at the first transmission rate in the local media buffer at a first buffer size;
provide buffered linear media data associated with the first streaming media session and received at the first transmission rate from the local media buffer for consumption on the media client;
identify an expected link transition between the first communication link and a second communication link;
determine whether the first communication link and the second communication link are on different communication access networks;
if it is determined that the first communication link and the second communication link are on different communication access networks:
increase buffering of the received linear media data in the local media buffer from the first buffer size to a second buffer size prior to an expected link transition initiation time between the first communication link and a second communication link, by receiving, via the transceiver, at a second transmission rate over the first communication link, linear media data associated with the first streaming media session from the remote media buffer, the second transmission rate being higher than the first transmission rate; and
provide, during a link transition time associated with the expected link transition initiation time, buffered linear media data associated with the first streaming media session and received at the second transmission rate from the local media buffer for consumption on the media client;
if it is determined that the first communication link and the second communication link are not on different communication access networks:
maintaining the first transmission rate over the first communication link and the first buffer size until the expected link transition; and
providing buffered linear media from the local media buffer of the first buffer size during the link transition time.

13. The system of claim 12, wherein the processor is further configured to cause the system to:
transmit to the remote media server, via the transceiver, a first instruction to increase the first transmission rate to the second transmission rate over the first communication link in response to determining that the first communication link and the second communication link are on different communication access networks.

14. The system of claim 12, wherein the processor is further configured to cause the system to:
receive, via the transceiver, linear media data associated with the first streaming media session from the remote media buffer associated with the remote media server and at the first transmission rate over the first communication link before the expected link transition initiation time and after the local media buffer reaches the second buffer size.

15. The system of claim 12, wherein the processor is further configured to cause the system to:
initiate a second streaming media session with the remote media server via the transceiver using the second communication link after the link transition time; and
receive, via the transceiver, linear media data associated with the second streaming media session from the remote media buffer associated with the remote media server over the second communication link.

16. The system of claim 12, wherein the second buffer size is such that the local media buffer will not be depleted during the link transition time when the first communication link and the second communication link are on different communication access networks.

17. The system of claim 12, wherein the first communication link is a first satellite communication link.

18. The system of claim 17, wherein the second communication link is an air-to-ground communications link.

19. The system of claim 12, wherein the processor is further configured to cause the system to:
determine an expected link transition duration between the first communication link and the second communication link; and
determine the second buffer size based on the expected link transition duration.

20. The system of claim 12, wherein the processor is further configured to cause the system to:

determine an expected link transition initiation time between the first communication link and a second communication link.

21. The system of claim 12, wherein the processor is further configured to cause the system to:
   determine whether the first communication link and the second communication link are on different communication access networks at least in part based on a path of the craft.

22. The system of claim 12, wherein the first communication link and the second communication link are determined to be on different communication access networks when the first communication link and the second communication link are on different satellite networks and the first communication link and the second communication link are determined not to be on different communication access networks when the first communication link and the second communication link are different beams of the same satellite.

* * * * *